(12) United States Patent
Colson et al.

(10) Patent No.: US 9,393,652 B2
(45) Date of Patent: Jul. 19, 2016

(54) TURBINE HOUSING

(71) Applicant: Hamilton Sundstrand Corporation, Windsor Locks, CT (US)

(72) Inventors: Darryl A. Colson, West Suffield, CT (US); Clarence J. Wytas, Stafford Springs, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 478 days.

(21) Appl. No.: 14/049,640

(22) Filed: Oct. 9, 2013

(65) Prior Publication Data

US 2015/0098814 A1    Apr. 9, 2015

(51) Int. Cl.
| | |
|---|---|
| *F01D 25/24* | (2006.01) |
| *B23P 19/10* | (2006.01) |
| *F01D 9/02* | (2006.01) |
| *F01D 11/02* | (2006.01) |
| *F02C 1/04* | (2006.01) |
| *F02C 7/32* | (2006.01) |
| *B64D 13/06* | (2006.01) |

(52) U.S. Cl.
CPC ............... *B23P 19/10* (2013.01); *F01D 9/026* (2013.01); *F01D 11/02* (2013.01); *F01D 25/243* (2013.01); *F02C 1/04* (2013.01); *B64D 2013/0603* (2013.01); *F02C 7/32* (2013.01); *Y10T 29/49229* (2015.01)

(58) Field of Classification Search
None
See application file for complete search history.

(56) References Cited

U.S. PATENT DOCUMENTS

| | | | |
|---|---|---|---|
| 7,402,020 B2 | 7/2008 | Beers et al. | |
| 8,347,647 B2 | 1/2013 | McAuliffe et al. | |
| 2010/0040467 A1* | 2/2010 | Mudel | F01D 25/243 415/214.1 |
| 2010/0074744 A1* | 3/2010 | Phillips, Jr. | F01D 9/026 415/208.1 |
| 2012/0051899 A1* | 3/2012 | Petitjean | F01D 9/026 415/205 |
| 2012/0156008 A1* | 6/2012 | Chrabascz | F16J 15/44 415/170.1 |
| 2012/0156009 A1 | 6/2012 | Colson et al. | |

\* cited by examiner

*Primary Examiner* — Craig Kim
*Assistant Examiner* — Michael Sehn
(74) *Attorney, Agent, or Firm* — Cantor Colburn LLP

(57) ABSTRACT

A turbine housing includes a turbine inlet plenum and a turbine housing body. The turbine housing body includes a turbine outlet mounting face, a seal plate mounting face, and a center bore formed between the turbine outlet mounting face and the seal plate mounting face. A first support is formed about the turbine inlet plenum and in contact with the turbine housing body. A relief pocket is formed in the first support proximate the seal plate mounting face. The relief pocket is formed at a first distance from a turbine housing center axis of the center bore and at a first depth relative to the seal plate mounting face. A ratio of the first distance to the first depth is between 2.66 and 2.90.

20 Claims, 8 Drawing Sheets

TURBINE HOUSING

BACKGROUND OF THE INVENTION

Exemplary embodiments of the invention generally relate to aircraft environmental control systems and, more particularly, to a turbine housing of an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to an aircraft cabin. ACMs commonly include at least one turbine and a compressor spaced axially at intervals on a common shaft. The turbine(s) and compressor are supported for rotation about the axis of the shaft by one or more bearing assemblies.

On aircraft powered by turbine engines, the air to be conditioned in the air cycle machine is typically compressed air bled from one or more compressor stages of a turbine engine. In conventional systems, this bleed air is passed through the air cycle machine compressor, where it is further compressed, then passed through a condensing heat exchanger to cool the compressed air. The heat exchanger sufficiently condenses moisture thereby dehumidifying the air. The dehumidified compressed air is then expanded in one of the turbines to extract energy from the compressed air so as to drive the shaft and also to cool the expanded turbine exhaust air as it is supplied to the cabin as conditioned cooling air.

ACM components are tightly packaged and include a number of fasteners to couple the ACM components together. Design features of the ACM components can interfere with fastener installation, making ACM assembly and servicing slower and more cumbersome.

BRIEF DESCRIPTION OF THE INVENTION

According to one embodiment of the invention, a turbine housing includes a turbine inlet plenum. A turbine housing body includes a turbine outlet mounting face, a seal plate mounting face, and a center bore formed between the turbine outlet mounting face and the seal plate mounting face. A first support is formed about the turbine inlet plenum and in contact with the turbine housing body. A relief pocket is formed in the first support proximate the seal plate mounting face. The relief pocket is formed at a first distance from a turbine housing center axis of the center bore and at a first depth relative to the seal plate mounting face. A ratio of the first distance to the first depth is between 2.66 and 2.90.

According to another embodiment of the invention, an air cycle machine assembly is provided. The air cycle machine assembly includes a turbine housing with a turbine inlet plenum. A turbine housing body includes a turbine outlet mounting face, a seal plate mounting face, and a center bore formed between the turbine outlet mounting face and the seal plate mounting face. A first support is formed about the turbine inlet plenum and in contact with the turbine housing body. A relief pocket is formed in the first support proximate the seal plate mounting face. The relief pocket is formed at a first distance from a turbine housing center axis of the center bore and at a first depth relative to the seal plate mounting face. A ratio of the first distance to the first depth is between 2.66 and 2.90. The air cycle machine assembly also includes a compressor housing, seal plate coupled to the turbine housing, and a fastener installed proximate the relief pocket and configured to couple the seal plate with the compressor housing.

A method of installing a turbine housing in an air cycle machine includes aligning an outer mounting hole of a seal plate with a relief pocket of the turbine housing. The turbine housing includes a turbine inlet plenum. A turbine housing body includes a turbine outlet mounting face, a seal plate mounting face, and a center bore formed between the turbine outlet mounting face and the seal plate mounting face. A first support is formed about the turbine inlet plenum and in contact with the turbine housing body. A relief pocket is formed in the first support proximate the seal plate mounting face. The relief pocket is formed at a first distance from a turbine housing center axis of the center bore and at a first depth relative to the seal plate mounting face. A ratio of the first distance to the first depth is between 2.66 and 2.90. The method also includes coupling the seal plate to the turbine housing and installing a fastener into the outer mounting hole proximate the relief pocket to couple the seal plate with a compressor housing.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
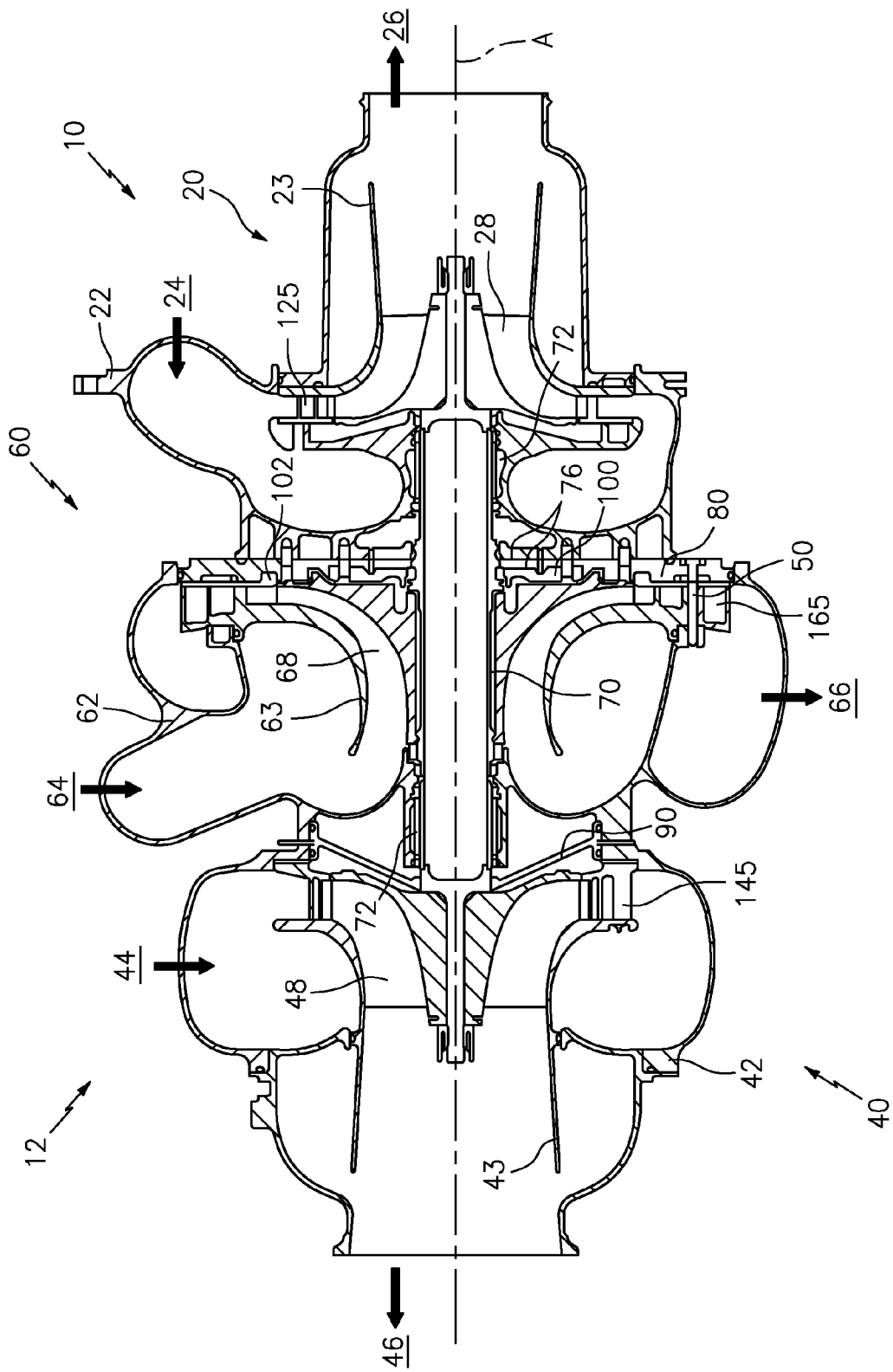
FIG. 1 is a cross-section of an air cycle machine (ACM) according to an embodiment.

Referring now to FIG. 1, an exemplary air cycle machine (ACM) 10 includes a first turbine 20, a second turbine 40, and a compressor 60. The ACM 10 includes a housing assembly 12 manufactured from multiple housing portions to provide a desired clearance for the compressor 60 and the turbines 20, 40. The ACM housing assembly 12 includes a first turbine housing 22, a compressor housing 62, and a second turbine housing 42. The ACM housing assembly 12 also includes first and second turbine shrouds 23 and 43, and a compressor shroud 63. The first turbine housing 22 and the second turbine housing 42 are connected to the centrally located compressor housing 62.

The first turbine 20 has an inlet 24, a nozzle 125, and an outlet 26. The second turbine 40 has an inlet 44, a nozzle 145, and an outlet 46. The compressor 60 also includes an inlet 64, a diffuser 165, and an outlet 66. The compressor 60 is driven by the first and second turbines 20 and 40. The first turbine 20 includes a first turbine rotor 28, the second turbine 40 includes a second turbine rotor 48, and the compressor 60 includes a compressor rotor 68. The first and second turbine rotors 28, 48 and the compressor rotor 68 are coupled to a shaft 70 for rotation about an axis A. In one embodiment, the shaft 70 is hollow and is supported within the ACM housing assembly 12 by bearings 72, such as hydrodynamic journal bearings, for example. The shaft 70 may include a plurality of apertures (not shown) such that a cooling flow enters into the shaft 70 to cool the bearings 72. Thrust bearings 76 are coupled to the shaft 70 to support axial loads in the ACM 10.

A first seal plate 80 separates air flow between the first turbine 20 and the compressor 60. A second seal plate 90 separates air flow between the compressor 60 and the second turbine 40. The first seal plate 80 is coupled to the first turbine housing 22 and the compressor housing 62. The second seal plate 90 is coupled to the second turbine housing 42 and the compressor housing 62. The first seal plate 80 is also coupled to a thrust plate 100 to constrain axial movement of the thrust bearings 76. A backing plate 102 may be installed between the diffuser 165 of the compressor 60 and the first seal plate 80. A plurality of fasteners 50, such as bolts, may be used to secure the seal plates 80 and 90. The illustrated ACM 10 is exemplary and other configurations known to a person skilled in the art are within the scope of this invention. A combination of two or more components of the ACM 10 is referred to generally as an ACM assembly.

Figure 2:
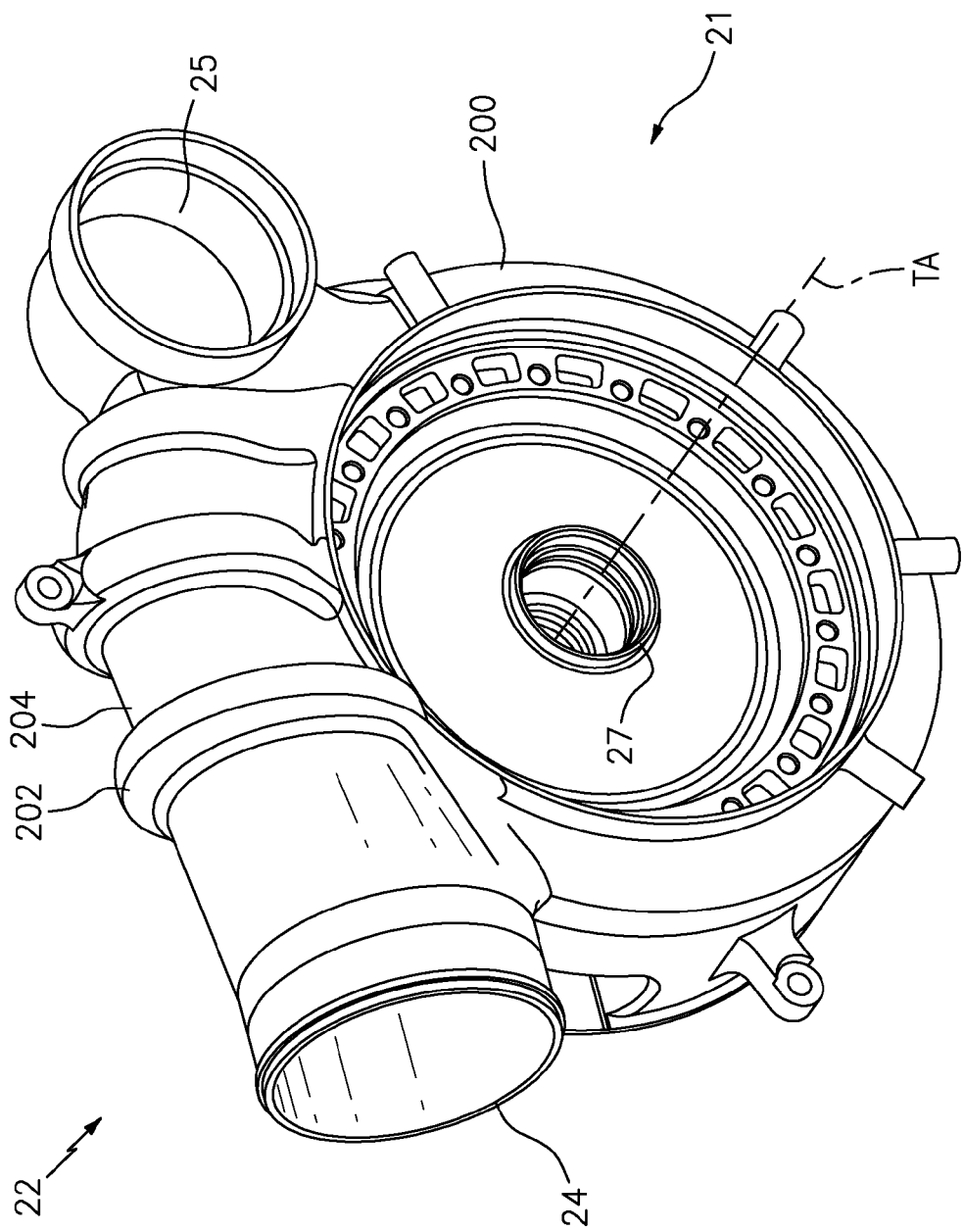
FIG. 2 is a perspective view of a turbine housing of the ACM of FIG. 1 according to an embodiment.

Referring now to FIG. 2, a perspective view of a turbine outlet mounting face 21 of the first turbine housing 22 of FIG. 1 is illustrated. The first turbine housing 22 is also referred to as the turbine housing 22 herein. In one embodiment, the turbine housing 22 is manufactured from a single piece of cast material. The turbine outlet mounting face 21 is formed in a turbine housing body 200. The inlet 24 and a bypass 25 are incorporated in the turbine housing 22. A first support 202 is formed about a turbine inlet plenum 204 proximate the inlet 24 and in contact with the turbine housing body 200. When installed in the ACM 10 of FIG. 1, a turbine housing center axis TA of a center bore 27 of the turbine housing 22 aligns with the central axis A of the ACM of FIG. 1.

Figure 3:
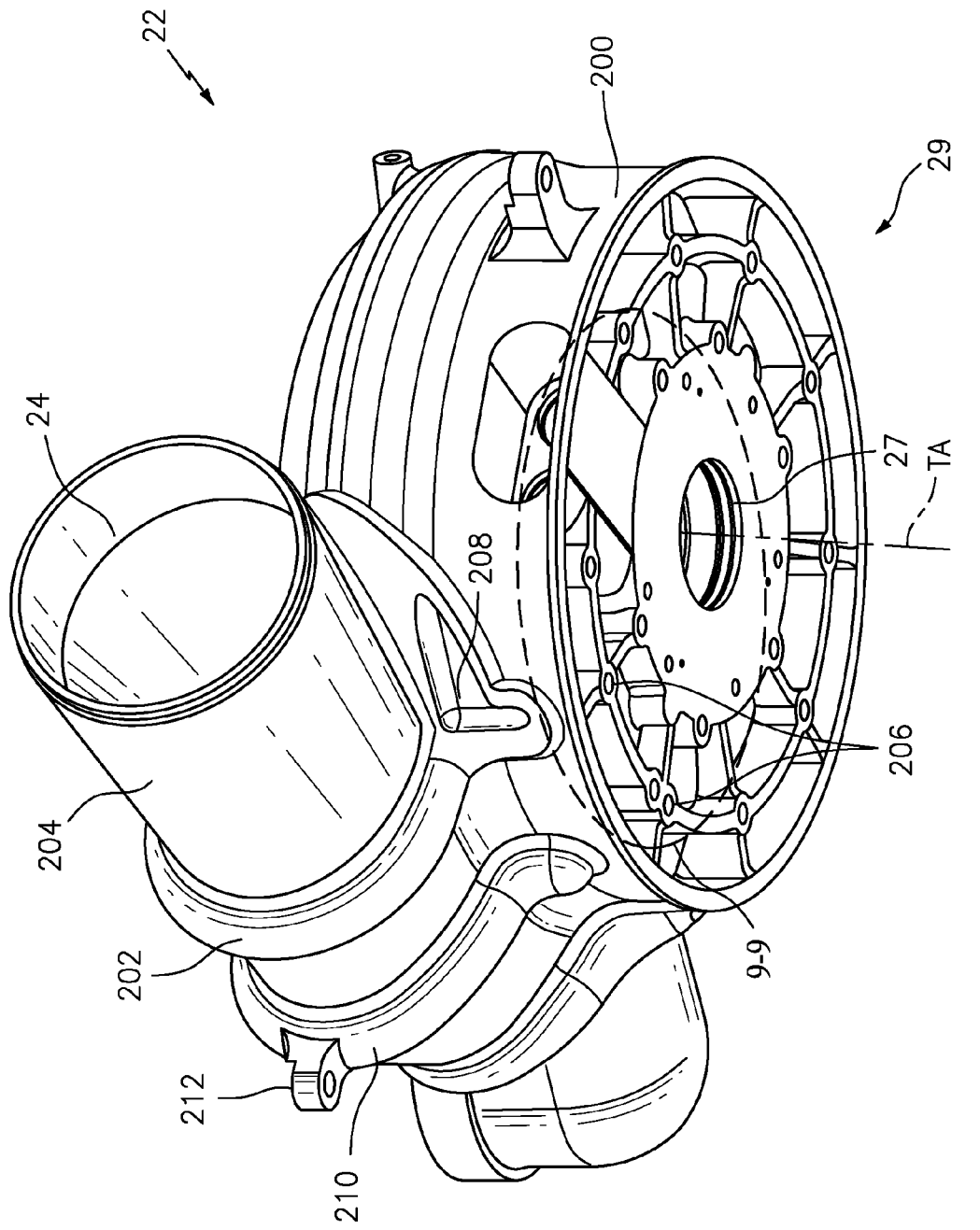
FIG. 3 is another perspective view of the turbine housing of the ACM of FIG. 1 according to an embodiment.

FIG. 3 depicts another perspective view of the turbine housing 22 of FIG. 1 in more detail, including a seal plate mounting face 29 formed in the turbine housing body 200. The center bore 27 is formed between the turbine outlet mounting face 21 of FIG. 2 and the seal plate mounting face 29. The seal plate mounting face 29 includes a number of fastener holes 206 distributed radially in an asymmetric pattern. The fastener holes 206 enable coupling of the turbine housing 22 to the first seal plate 80 of FIG. 1, also referred to as seal plate 80. A relief pocket 208 is formed in the first support 202 proximate the seal plate mounting face 29. The relief pocket 208 provides an access point for a fastener installed external to the turbine housing 22 while maintaining structure integrity of the first support 202 in an aerospace environment. A second support 210 is formed about the turbine inlet plenum 204 and in contact with the turbine housing body 200. The second support 210 includes a casting target 212.

Figure 4:
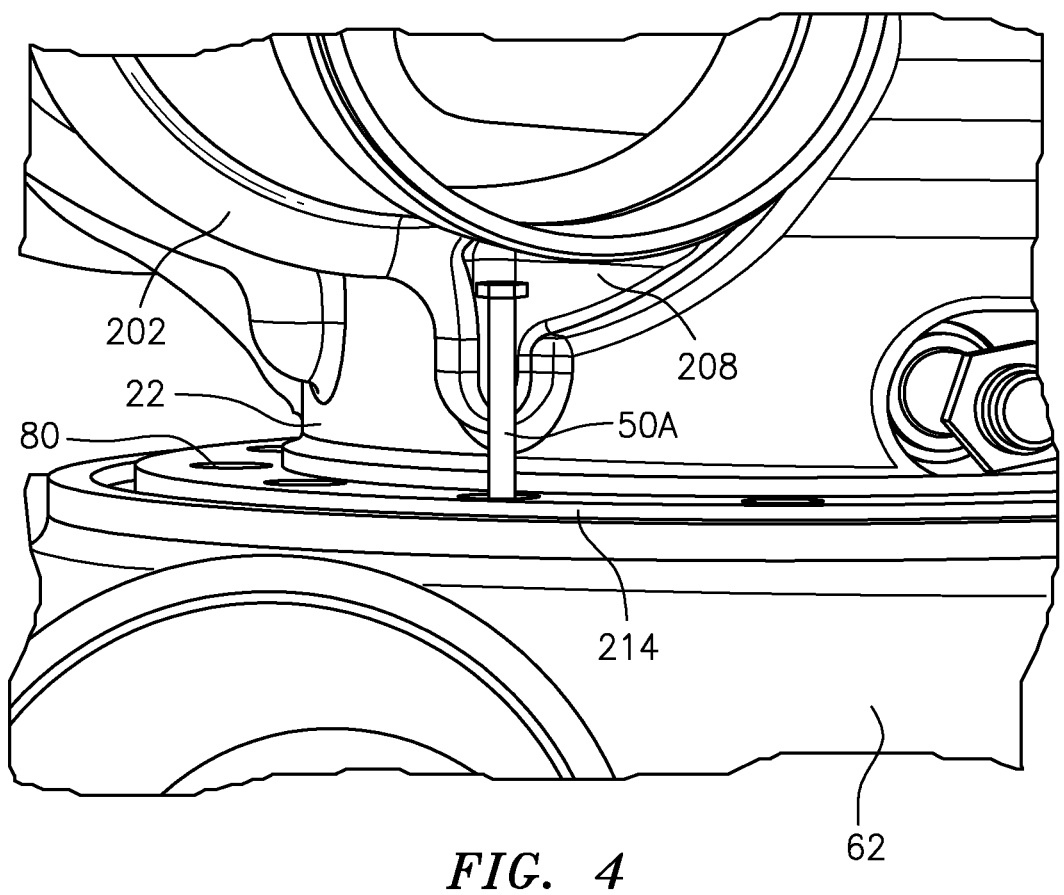
FIG. 4 is a view of a fastener installation location for the turbine housing of the ACM of FIG. 1 according to an embodiment.

FIG. 4 is a view of a fastener installation location for the turbine housing 22 of the ACM 10 of FIG. 1 according to an embodiment. An outer mounting hole 214 of seal plate 80 is aligned with the relief pocket 208 of the turbine housing 22. The seal plate 80 is coupled to the turbine housing 22 using one or more of the fastener holes 206 of FIG. 3. A fastener 50A of the plurality of fasteners 50 of FIG. 1 is installed into the outer mounting hole 214 proximate the relief pocket 208 to couple the seal plate 80 with the compressor housing 62 and the diffuser 165 of FIG. 1.

Figure 5:
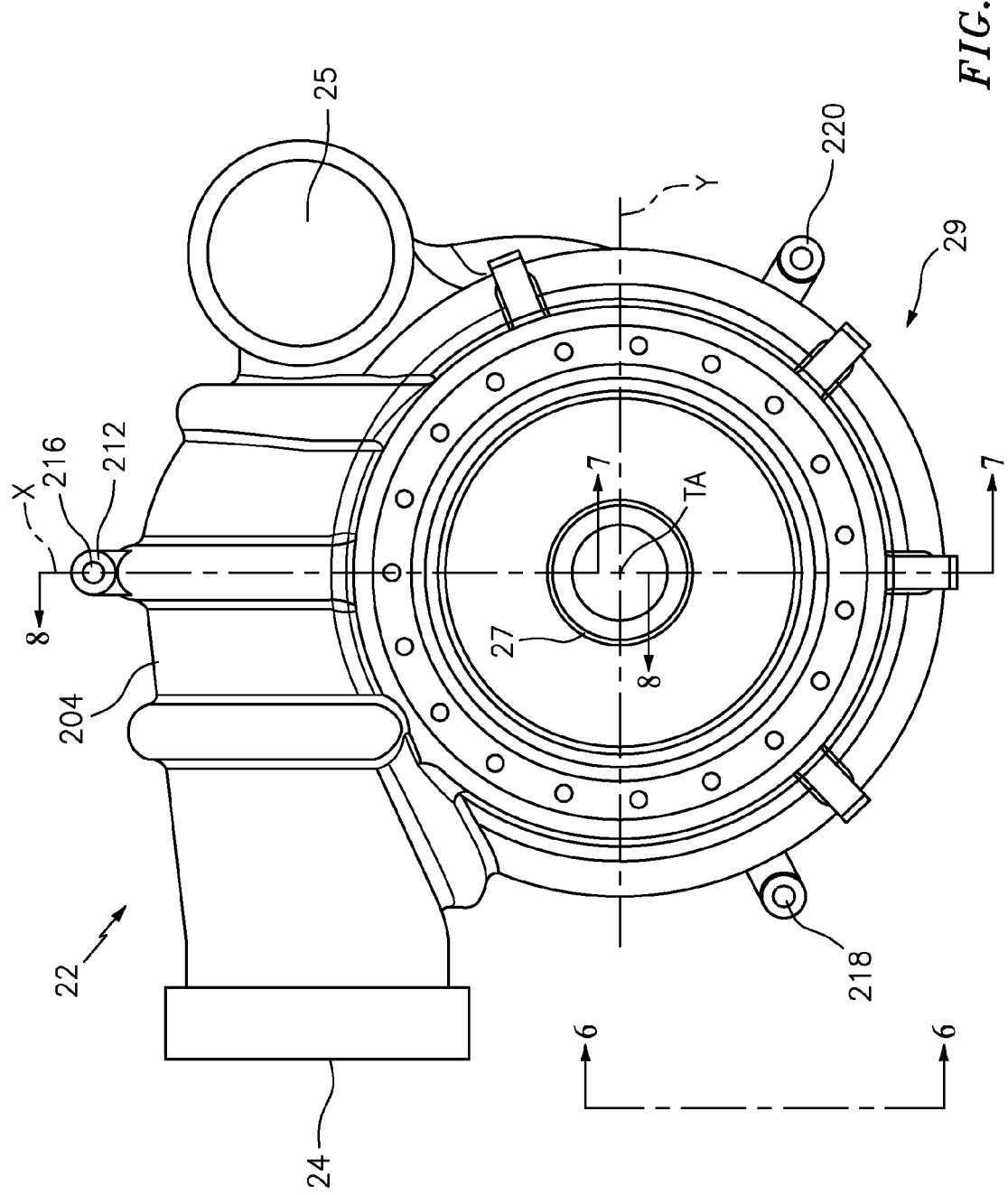
FIG. 5 is another view of the turbine housing of the ACM of FIG. 1 according to an embodiment.

FIG. 5 is another view of the turbine housing 22 of the ACM 10 of FIG. 1 according to an embodiment. The casting target 212 includes a center hole 216. A first datum X is formed by a plane passing through the turbine housing center axis TA and the center hole 216. A second datum Y is formed perpendicular to the first datum X. The turbine housing 22 also include two other casting targets 218 and 220, where the casting targets 212, 218 and 220 are separated by about 120 degrees.

Figure 6:
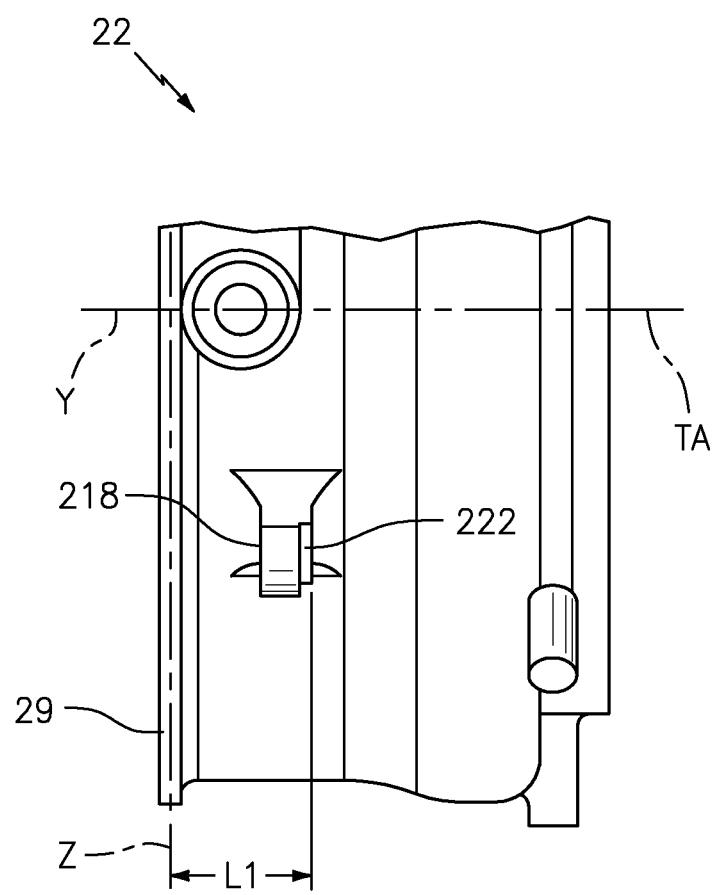
FIG. 6 is a partial side view of the turbine housing of FIG. 5 according to an embodiment.
Figure 8:
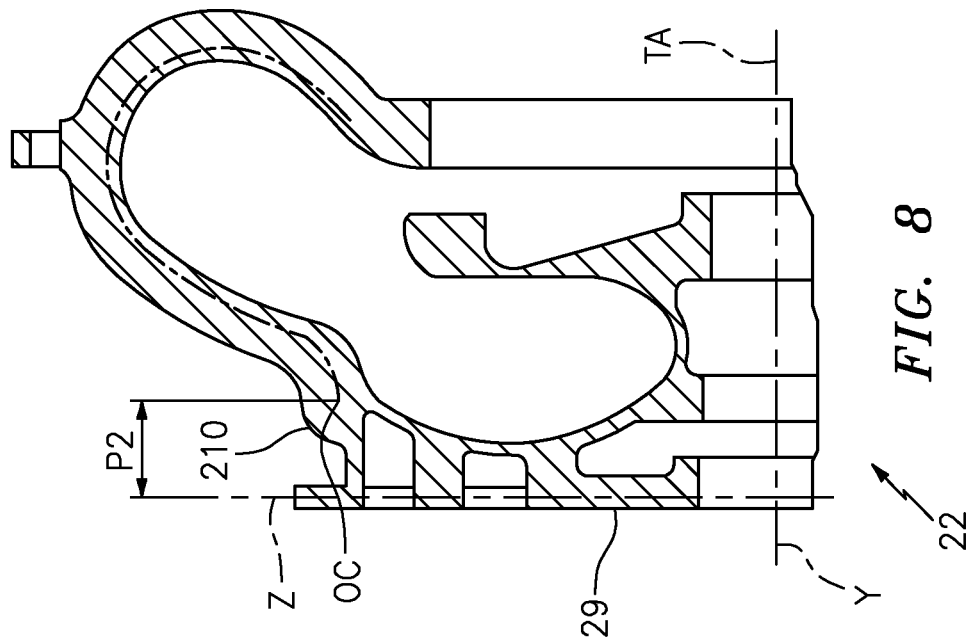
FIG. 8 is another cross-section of the turbine housing of FIG. 5 according to an embodiment.
Figure 7:
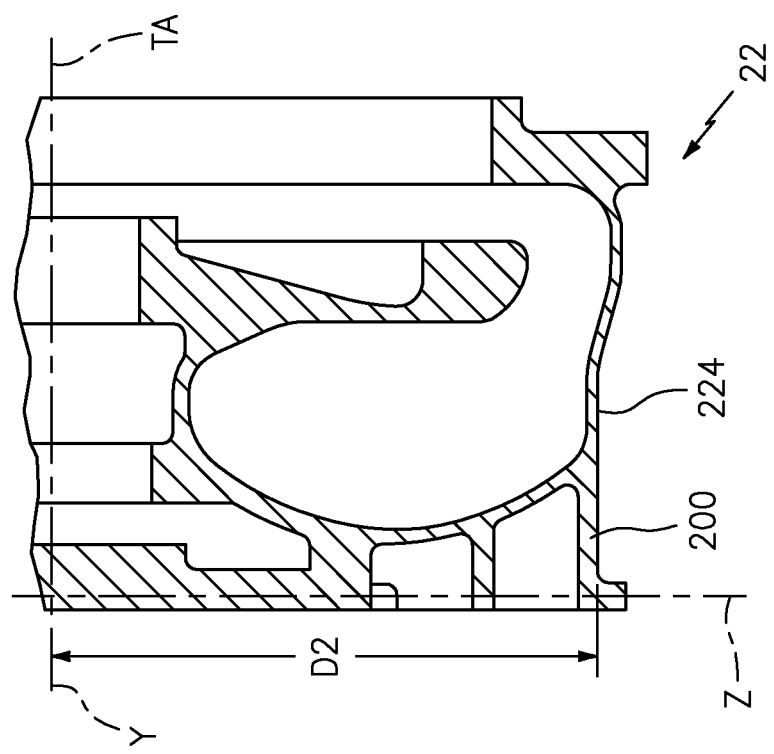
FIG. 7 is a cross-section of the turbine housing of FIG. 5 according to an embodiment.

FIG. 6 is a partial side view of the turbine housing 22 of FIG. 5 according to an embodiment. A third datum Z is formed on the seal plate mounting face 29, where a length L1 between the third datum Z and a notch 222 in the casting target 218 is about 1.585 inches (4.0259 cm). FIG. 7 is a cross-section of the turbine housing 22 of FIG. 5 according to an embodiment. The turbine housing body 200 includes an outer perimeter 224 at a distance D2 of about 5.820 inches (14.7828 cm) from the turbine housing center axis TA. FIG. 8 is another cross-section of the turbine housing 22 of FIG. 5 according to an embodiment. The second support 210 includes an origin of curvature OC at a depth P2 from the seal plate mounting face 29 at the third datum Z of about 1.295 inches (3.2893 cm).

Figure 9:
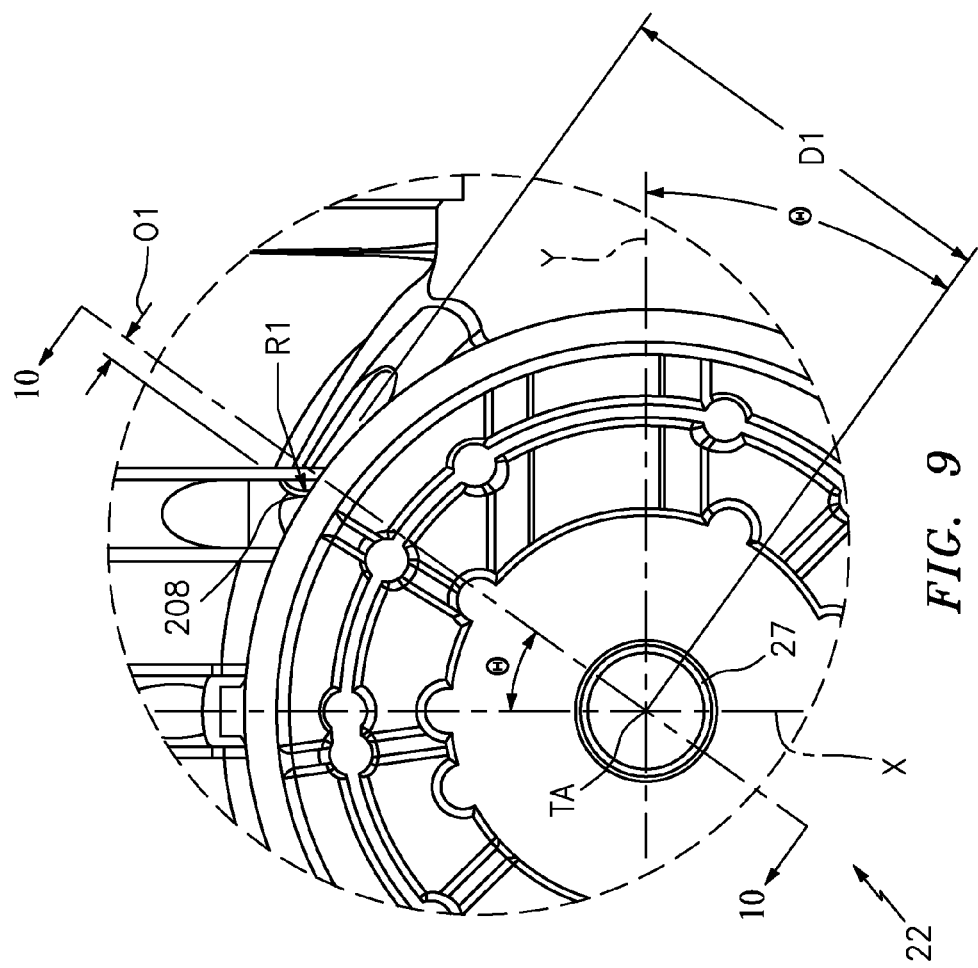
FIG. 9 is a view of the turbine housing of FIG. 3 at area 9-9 according to an embodiment.

FIG. 9 is a view of the turbine housing 22 of FIG. 3 at area 9-9 according to an embodiment. The relief pocket 208 is formed at a distance D1 of about 6.1 inches (15.494 cm) from the turbine housing center axis TA of the center bore 27. The relief pocket 208 is formed at an angle $\Theta$ of about 35.5 degrees relative to the first datum X. A relief pocket radius R1 of about 0.25 inches (0.635 cm) is formed at the first distance D1 extending an offset distance O1 of about 0.36 inches (0.9144 cm) from the angle $\Theta$.

Figure 10:
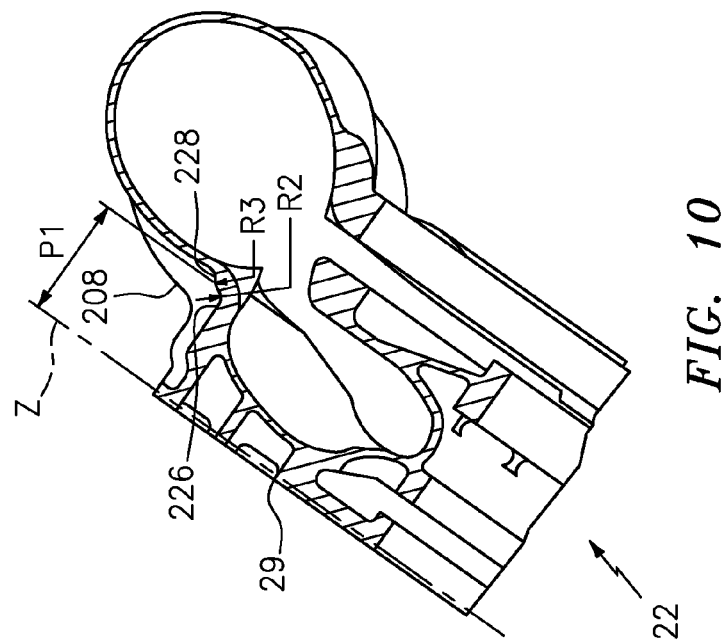
FIG. 10 is a cross-section of the turbine housing of FIG. 9 according to an embodiment.

FIG. 10 is a cross-section of the turbine housing 22 of FIG. 9 according to an embodiment. The relief pocket 208 has a depth P1 of about 2.200 inches (5.588 cm) relative to the seal plate mounting face 29 at the third datum Z. The relief pocket 208 also includes an inner contour 226 having an inner contour radius R2 of about 0.25 inches (0.635 cm) and an outer contour 228 having an outer contour radius R3 of about 0.125 inches (0.3175 cm).

In an embodiment, a ratio of first distance D1 to first depth P1 is between 2.66 and 2.90. A ratio of offset distance O1 to the relief pocket radius R1 is between 1.26 and 1.66. A ratio of inner contour radius R2 to outer contour radius R3 is between 1.41 and 2.95. A ratio of first depth P1 to second depth P2 is between 1.52 and 1.91. A ratio of first distance D1 to second distance D2 is between 1.04 and 1.05.

A process for installing the turbine housing 22 in the ACM 10 of FIG. 1 is described in reference to FIGS. 1-10. The sequence of assembly during installation of the turbine housing 22 in the ACM 10 can vary in embodiments. The process includes aligning outer mounting hole 214 of seal plate 80 with relief pocket 208 of the turbine housing 22. The seal plate 80 is coupled to the turbine housing 22. A fastener 50A is installed into the outer mounting hole 214 proximate the relief pocket 208 to couple the seal plate 80 with compressor housing 62. A plurality of fasteners 50 is also installed to couple the seal plate 80 with the compressor housing 62 and diffuser 165. As previously described, the turbine housing 22 includes a turbine inlet plenum 204 and a turbine housing body 200. The turbine housing body 200 includes a turbine outlet mounting face 21, a seal plate mounting face 29, and a center bore 27 formed between the turbine outlet mounting face 21 and the seal plate mounting face 29. A first support 202 is formed about the turbine inlet plenum 204 and in contact with the turbine housing body 200. A relief pocket 208 is formed in the first support 202 proximate the seal plate mounting face 29. The relief pocket 208 is formed at a first distance D1 from a turbine housing center axis TA of the center bore 27 and at a first depth P1 relative to the seal plate mounting face 29 at third datum Z.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine housing, comprising:
a turbine inlet plenum;
a turbine housing body comprising a turbine outlet mounting face, a seal plate mounting face, and a center bore formed between the turbine outlet mounting face and the seal plate mounting face;
a first support formed about the turbine inlet plenum and in contact with the turbine housing body; and
a relief pocket formed in the first support proximate the seal plate mounting face, the relief pocket formed at a first distance from a turbine housing center axis of the center bore and at a first depth relative to the seal plate mounting face, wherein a ratio of the first distance to the first depth is between 2.66 and 2.90.

2. The turbine housing according to claim 1, further comprising:
a second support formed about the turbine inlet plenum and in contact with the turbine housing body, the second support comprising a casting target having a center hole, wherein a first datum is formed by a plane passing through the turbine housing center axis and the center hole.

3. The turbine housing according to claim 2, wherein the relief pocket is formed at an angle of about 35.5 degrees relative to the first datum.

4. The turbine housing according to claim 3, wherein a relief pocket radius is formed at the first distance extending an offset distance from the angle, and a ratio of the offset distance to the relief pocket radius is between 1.26 and 1.66.

5. The turbine housing according to claim 2, wherein the relief pocket further comprises an inner contour having an inner contour radius, an outer contour having an outer contour radius, and a ratio of the inner contour radius to the outer contour radius is between 1.41 and 2.95.

6. The turbine housing according to claim 5, wherein the second support further comprises an origin of curvature at a second depth from the seal plate mounting face, and a ratio of the first depth to the second depth is between 1.52 and 1.91.

7. The turbine housing according to claim 1, wherein the turbine housing body further comprises an outer perimeter at a second distance from the turbine housing center axis, and a ratio of the first distance to the second distance is between 1.04 and 1.05.

8. An air cycle machine assembly comprising:
a turbine housing, comprising:
a turbine inlet plenum;
a turbine housing body comprising a turbine outlet mounting face, a seal plate mounting face, and a center bore formed between the turbine outlet mounting face and the seal plate mounting face;
a first support formed about the turbine inlet plenum and in contact with the turbine housing body; and
a relief pocket formed in the first support proximate the seal plate mounting face, the relief pocket formed at a first distance from a turbine housing center axis of the center bore and at a first depth relative to the seal plate mounting face, wherein a ratio of the first distance to the first depth is between 2.66 and 2.90;
a compressor housing;
a seal plate coupled to the turbine housing; and
a fastener installed proximate the relief pocket and configured to couple the seal plate with the compressor housing.

9. The air cycle machine assembly according to claim 8, wherein the turbine housing further comprises a second support formed about the turbine inlet plenum and in contact with the turbine housing body, the second support comprising a casting target having a center hole, wherein a first datum is formed by a plane passing through the turbine housing center axis and the center hole.

10. The air cycle machine assembly according to claim 9, wherein the relief pocket is formed at an angle of about 35.5 degrees relative to the first datum.

11. The air cycle machine assembly according to claim 10, wherein a relief pocket radius is formed at the first distance extending an offset distance from the angle, and a ratio of the offset distance to the relief pocket radius is between 1.26 and 1.66.

12. The air cycle machine assembly according to claim 9, wherein the relief pocket further comprises an inner contour having an inner contour radius, an outer contour having an outer contour radius, and a ratio of the inner contour radius to the outer contour radius is between 1.41 and 2.95.

13. The air cycle machine assembly according to claim 12, wherein the second support further comprises an origin of curvature at a second depth from the seal plate mounting face, and a ratio of the first depth to the second depth is between 1.52 and 1.91.

14. The air cycle machine assembly according to claim 8, wherein the turbine housing body further comprises an outer perimeter at a second distance from the turbine housing center axis, and a ratio of the first distance to the second distance is between 1.04 and 1.05.

15. A method of installing a turbine housing in an air cycle machine, comprising:
aligning an outer mounting hole of a seal plate with a relief pocket of the turbine housing, the turbine housing comprising:
a turbine inlet plenum;
a turbine housing body comprising a turbine outlet mounting face, a seal plate mounting face, and a center bore formed between the turbine outlet mounting face and the seal plate mounting face;
a first support formed about the turbine inlet plenum and in contact with the turbine housing body; and
the relief pocket formed in the first support proximate the seal plate mounting face, the relief pocket formed at a first distance from a turbine housing center axis of the center bore and at a first depth relative to the seal plate mounting face, wherein a ratio of the first distance to the first depth is between 2.66 and 2.90;
coupling the seal plate to the turbine housing; and installing a fastener into the outer mounting hole proximate the relief pocket to couple the seal plate with a compressor housing.

16. The method according to claim 15, wherein the turbine housing further comprises a second support formed about the turbine inlet plenum and in contact with the turbine housing body, the second support comprising a casting target having a center hole, wherein a first datum is formed by a plane passing through the turbine housing center axis and the center hole.

17. The method according to claim 16, wherein the relief pocket is formed at an angle of about 35.5 degrees relative to the first datum.

18. The method according to claim 17, wherein a relief pocket radius is formed at the first distance extending an offset distance from the angle, and a ratio of the offset distance to the relief pocket radius is between 1.26 and 1.66.

19. The method according to claim 16, wherein the relief pocket further comprises an inner contour having an inner contour radius, an outer contour having an outer contour radius, and a ratio of the inner contour radius to the outer contour radius is between 1.41 and 2.95.

20. The method according to claim 19, wherein the second support further comprises an origin of curvature at a second depth from the seal plate mounting face, and a ratio of the first depth to the second depth is between 1.52 and 1.91.

* * * * *